(12) United States Patent
Lu et al.

(10) Patent No.: US 12,563,176 B2
(45) Date of Patent: Feb. 24, 2026

(54) VIRTUAL IMAGE DISPLAY DEVICE AND STEREOSCOPIC IMAGE ESTABLISHING METHOD

(71) Applicant: HTC Corporation, Taoyuan (TW)

(72) Inventors: Tsung-Lin Lu, Taoyuan (TW); Ching-Chia Chou, Taoyuan (TW); Chung-Hsiang Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 104 days.

(21) Appl. No.: 18/531,726

(22) Filed: Dec. 7, 2023

(65) Prior Publication Data

US 2025/0193369 A1     Jun. 12, 2025

(51) Int. Cl.
*H04N 13/398* (2018.01)
*H04N 13/156* (2018.01)
*H04N 13/344* (2018.01)

(52) U.S. Cl.
CPC ......... *H04N 13/398* (2018.05); *H04N 13/156* (2018.05); *H04N 13/344* (2018.05)

(58) Field of Classification Search
CPC ... H04N 13/398; H04N 13/156; H04N 13/344
USPC .......................................................... 348/53
See application file for complete search history.

(56) References Cited

U.S. PATENT DOCUMENTS

| | | | | |
|---|---|---|---|---|
| 11,277,597 | B1 * | 3/2022 | Canberk | ................... G06T 7/73 |
| 2014/0168261 | A1 * | 6/2014 | Margolis | .............. H04N 13/344 |
| | | | | 345/633 |
| 2015/0084840 | A1 * | 3/2015 | Kim | ..................... G02B 27/017 |
| | | | | 345/8 |
| 2019/0043259 | A1 * | 2/2019 | Wang | ...................... G06F 3/012 |
| 2020/0128232 | A1 * | 4/2020 | Hwang | ............... A61B 5/0022 |
| 2021/0233312 | A1 * | 7/2021 | Noris | .................. H04N 13/279 |
| 2021/0312713 | A1 * | 10/2021 | Peri | ......................... H04L 67/75 |
| 2021/0392318 | A1 * | 12/2021 | Cappello | ............. H04N 13/344 |
| 2022/0020168 | A1 * | 1/2022 | Price | ...................... G06F 3/012 |
| 2022/0021860 | A1 * | 1/2022 | Bleyer | ...................... G06T 7/30 |
| 2022/0182777 | A1 * | 6/2022 | Canberk | ................ H04S 7/303 |
| 2023/0066686 | A1 * | 3/2023 | Chen | ..................... G06V 10/457 |
| 2024/0257309 | A1 * | 8/2024 | Holland | ................... G06T 7/30 |

FOREIGN PATENT DOCUMENTS

CN          116194866          5/2023

OTHER PUBLICATIONS

"Office Action of Taiwan Counterpart Application", issued on Nov. 7, 2024, p. 1-p. 10.

* cited by examiner

*Primary Examiner* — Tung T Vo
(74) *Attorney, Agent, or Firm* — JCIPRNET

(57)          ABSTRACT

A virtual image display device and a stereoscopic image establishing method are provided. The virtual image display device includes a head-mounted display and an accessory. The head-mounted display performs an image capturing operation on a first region of an object to obtain first image information. The accessory has a first image capturing device for performing an image capturing operation on a second region of the object to obtain second image information. The head-mounted display establishes stereoscopic image information of the object based on the first image information and the second image information.

14 Claims, 4 Drawing Sheets

100

VIRTUAL IMAGE DISPLAY DEVICE AND STEREOSCOPIC IMAGE ESTABLISHING METHOD

BACKGROUND

Technical Field

The disclosure relates to a virtual image display device and a stereoscopic image establishing method, and particularly relates to a virtual image display device that improves convenience of use and a stereoscopic image establishing method.

Description of Related Art

Along with increasing popularity of virtual reality applications, virtual image display device has gradually become an important electronic tool in people's lives. Regarding the virtual image display device used to generate virtual reality/augmented reality effects, in the conventional technical field, in order to obtain depth information of an object, a depth sensor needs to be installed on a helmet (a head-mounted display). As a result, a weight of the helmet is greatly increased. Moreover, power consumption and computing power of the helmet have been greatly increased. The key point is that when performing environmental depth sensing, a user needs to continuously rotate the helmet to obtain enough depth-of-field information to establish a stereoscopic image, which causes inconvenience in use for the user. Moreover, the continuous rotation of the helmet may also cause the user to feel dizzy, which reduces comfort during use.

SUMMARY

The disclosure is directed to a virtual image display device and a stereoscopic image establishing method, which are adapted to convenience in use.

The disclosure provides a virtual image display device including a head-mounted display and an accessory. The head-mounted display performs an image capturing operation on a first region of an object to obtain first image information. The accessory has a first image capturing device for performing an image capturing operation on a second region of the object to obtain second image information. The head-mounted display establishes stereoscopic image information of the object based on the first image information and the second image information.

The disclosure provides a stereoscopic image establishing method including: enabling a head-mounted display to perform an image capturing operation on a first region of an object to obtain first image information; enabling a first image capturing device of an accessory to perform an image capturing operation on a second region of the object to obtain second image information; and establishing stereoscopic image information of the object based on the first image information and the second image information.

Based on the above, the virtual image display device of the disclosure provides the head-mounted display and the accessory to perform image capturing operations on the object in different angles. Furthermore, the virtual image display device establishes the stereoscopic image information of the object by combining the image information obtained by the head-mounted display and the accessory respectively. In this case, the user does not need to move the head-mounted display multiple times in order to obtain the stereoscopic image of the object, which effectively improves the convenience of use.

DESCRIPTION OF THE EMBODIMENTS

Figure 1:
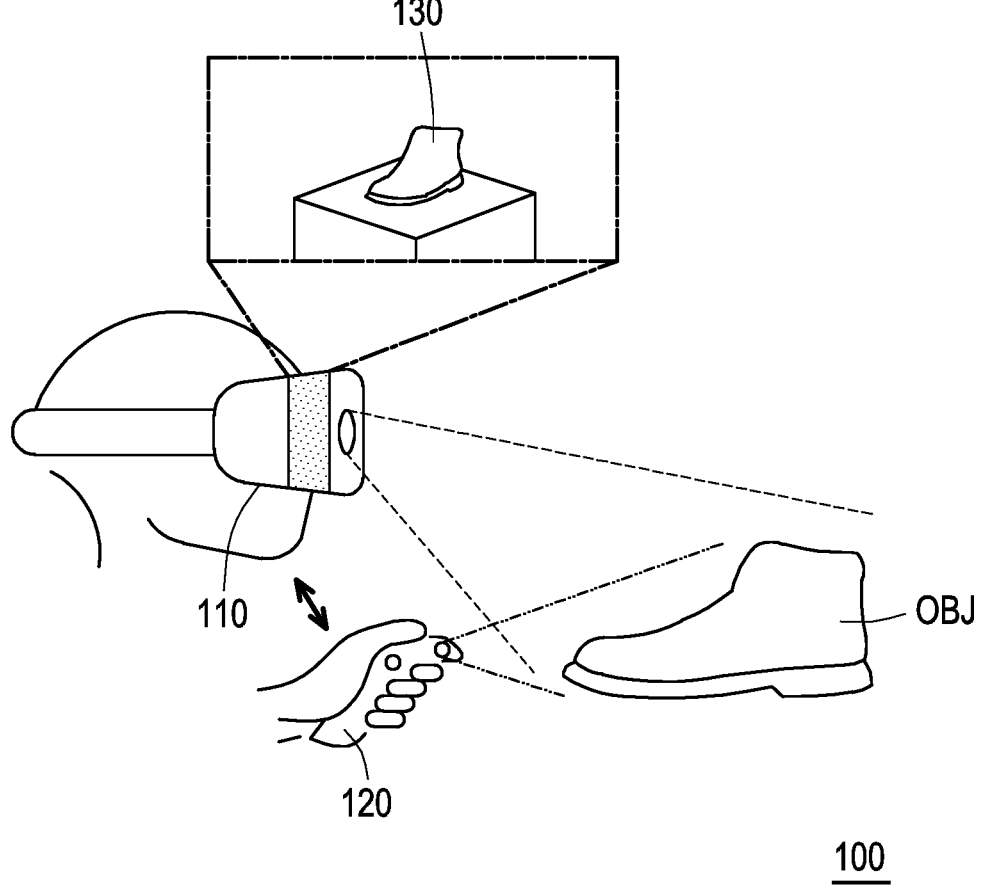
FIG. 1 is a schematic diagram of a virtual image display device according to an embodiment of the disclosure.

Referring to FIG. 1, FIG. 1 is a schematic diagram of a virtual image display device according to an embodiment of the disclosure. The virtual image display device 100 includes a head-mounted display 110 and an accessory 120. Where, the head-mounted display 110 may be worn on a head of a user, and the accessory 120 may be held by a hand of the user. The head-mounted display 110 and the accessory 120 may both be provided with image capturing devices. Where, the image capturing device of the head-mounted display 110 may perform an image capturing operation on a first region of an object OBJ according to a first orientation, so as to obtain first image information. In addition, the image capturing device of the accessory 120 may perform an image capturing operation on a second region of the object OBJ according to a second orientation, so as to obtain second image information. The head-mounted display 110 and the accessory 120 may be connected through wireless signals via a wireless transmission interface, and perform information transmission operations. Where, the accessory 120 may transmit the second image information to the head-mounted display 110 through the wireless signals. Further, the head-mounted display 110 may establish stereoscopic image information of the object OBJ by combining the first image information and the second image information. Furthermore, the head-mounted display 110 may generate and display a stereoscopic image 130 of the object OBJ according to the stereoscopic image information.

In detail, the first region of the object corresponding to the image capturing operation performed by the head-mounted display 110 and the second region of the object corresponding to the image capturing operation performed by the accessory 120 are partially overlapped but not completely overlapped. In the embodiment of the disclosure, the first image information obtained by the head-mounted display 110 may be high-quality image data with relatively high resolution. In contrast, the second image information obtained by the accessory 120 may be depth-of-field image information with relatively low resolution. Namely, the image capturing device in the accessory 120 may be a depth-of-field camera, such as a time of flight (TOF) camera.

In addition, in the embodiment, the head-mounted display 110 and the accessory 120 may each have an inertial measurement unit (IMU). The inertial measurement unit of the head-mounted display 110 is used to measure first posture information of the head-mounted display 110, and the inertial measurement unit of the accessory 120 is used to measure second posture information of the accessory 120. The accessory 120 may transmit the second posture information to the head-mounted display 110. Further, the head-mounted display 110 may perform a posture synchronization operation between the head-mounted display 110 and the accessory 120 according to the first posture information and the second posture information, and through the gesture synchronization operation, gestures of the first image information and the second image information may match each other.

Furthermore, in the embodiment, the second image information obtained by the accessory 120 may be point cloud information. The point cloud information is information of a plurality of points in space. These points may construct a stereoscopic shape in space. Each point in the point cloud may have its own coordinate values. In some embodiments, each point in the point cloud may also have color information and reflective surface intensity information of the object.

The head-mounted display 110 may combine the first image information with the point cloud information provided by the accessory 120, so as to generate the stereoscopic image information of the object OBJ.

Regarding details of the combining operation, the head-mounted display 110 may identify a plurality of first feature points in the first image information, and identify a plurality of second feature points in the point cloud information (the second image information). Further, the head-mounted display 110 may match the plurality of first feature points with the corresponding second feature points based on an overlapping portion of the first image information and the second image information, so that the first image information and the point cloud information (the second image information) are combined. Based on the point cloud information, a polygon picture corresponding to the object OBJ is generated.

Furthermore, the head-mounted display 110 may generate the stereoscopic image information of the object OBJ by projecting a texture picture to the generated polygon picture and combining it with the first image information.

In the embodiment, the head-mounted display 110 may pre-store a plurality of different texture pictures in a database. When performing a scanning operation of the object OBJ, the head-mounted display 110 may analyze a texture state of the object OBJ in the first image information, and find the texture picture in the database that is closest to the texture state of the object OBJ, or calculate the texture picture from a plurality of images, and finally project the texture picture onto the polygon picture. In other embodiments of the disclosure, the head-mounted display 110 may also provide the plurality of different texture pictures for the user to select. In these embodiments, the user may select a texture picture according to his own preference to generate the stereoscopic image information that is the same as or different from the actual texture state of the object OBJ.

From the above description, it is easy to know that in the embodiment, the virtual image display device 100 may simply obtain the first image information and the second image information that are sufficient to establish the stereoscopic image information of the object OBJ through the head-mounted display 110 and the accessory 120. The user does not need to follow the instructions of the head mounted display 110 to obtain sufficient image information by moving the helmet by multiple times in order to establish the stereoscopic image information of the object OBJ. In addition to effectively improving the convenience of use, it may also prevent the user from getting dizzy due to frequent shaking of his head, thereby effectively improving the comfort of use.

Figure 2:
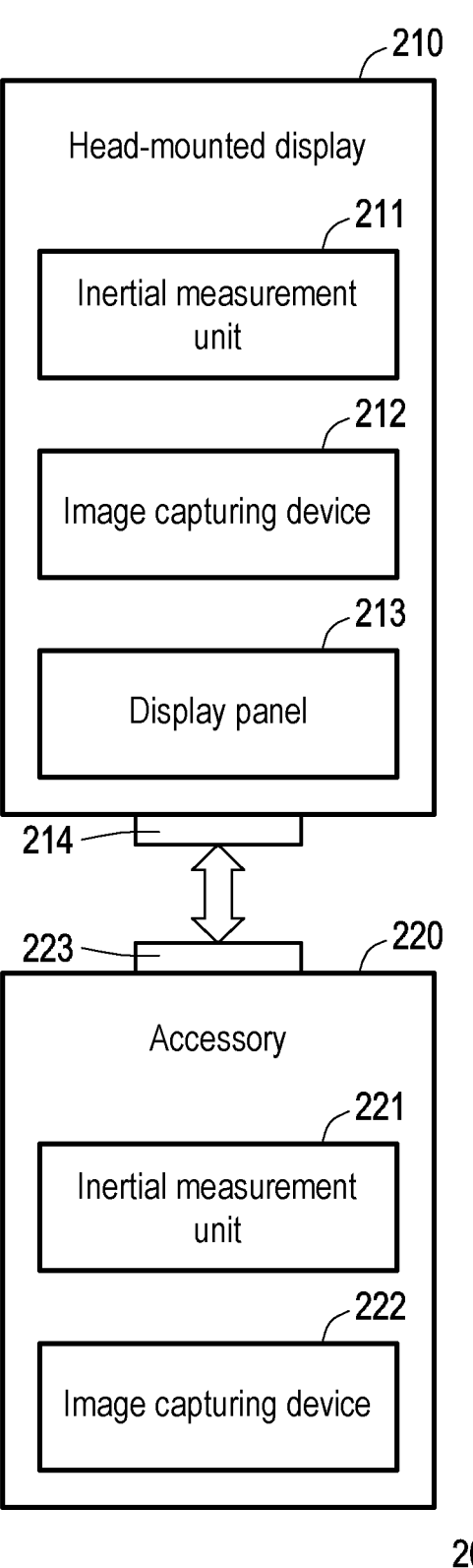
FIG. 2 is a block diagram of a virtual image display device according to an embodiment of the disclosure.

Referring to FIG. 2, FIG. 2 is a block diagram of a virtual image display device according to an embodiment of the disclosure. A virtual image display device 200 includes a head-mounted display 210 and an accessory 220. The head-mounted display 210 includes an inertial measurement unit 211, an image capturing device 212, a display panel 213 and a wireless transmission interface 214. The accessory 220 include an inertial measurement unit 221, an image capturing device 222 and a wireless transmission interface 223.

The head-mounted display 210 and the accessory 220 may perform a wireless connection operation through the wireless transmission interfaces 214 and 223, so as to implement signal transmission operations there between. In the embodiment, the wireless transmission interfaces 214 and 223 may be any form of wireless transmission interface circuit well known to those of ordinary skill in the art without specific limitations.

In the head-mounted display 210, the inertial measurement unit 211 is configured to measure posture information of the head-mounted display 210. The inertial measurement unit 211 may compare a gravity axis with a preset coordinate axis of the head-mounted display 210 to obtain the posture information of the head-mounted display 210. The image capturing device 212 may be a camera or video camera with relatively high image quality, and may obtain the first image information with relatively high image quality. The display panel 213 may be any form of display panel and may be used to display a stereoscopic image of an object.

In the accessory 220, the inertial measurement unit 221 is used to measure the posture information of the accessory 220. The inertial measurement unit 221 may also compare a gravity axis with a preset coordinate axis of the accessory 220 to obtain the posture information of the accessory 220. The image capturing device 212 is a depth-of-field camera used to obtain the second image information as the point cloud information.

It should be noted that the head-mounted display 210 may further include a controller and a memory (not shown). The controller may be used to perform: a posture synchronization operation between the head-mounted display 210 and the accessory 220; a combination operation of the first image and the point cloud information; a selection and projection operation of the texture picture; and various computation operations required to be executed by the virtual image display device. The memory may be used to store a plurality of preset texture pictures, and various information required by the controller during the computation process.

In the embodiment, the above-mentioned controller may be a hardware circuit designed through a hardware description language (HDL) or any other digital circuit design method well known to those with ordinary knowledge in the art, and implemented through field programmable gate array (FPGA), complex programmable logic device (CPLD) or application-specific integrated circuit (ASIC). The memory may be implemented by any type of memory circuit without specific limitations.

Figure 3:
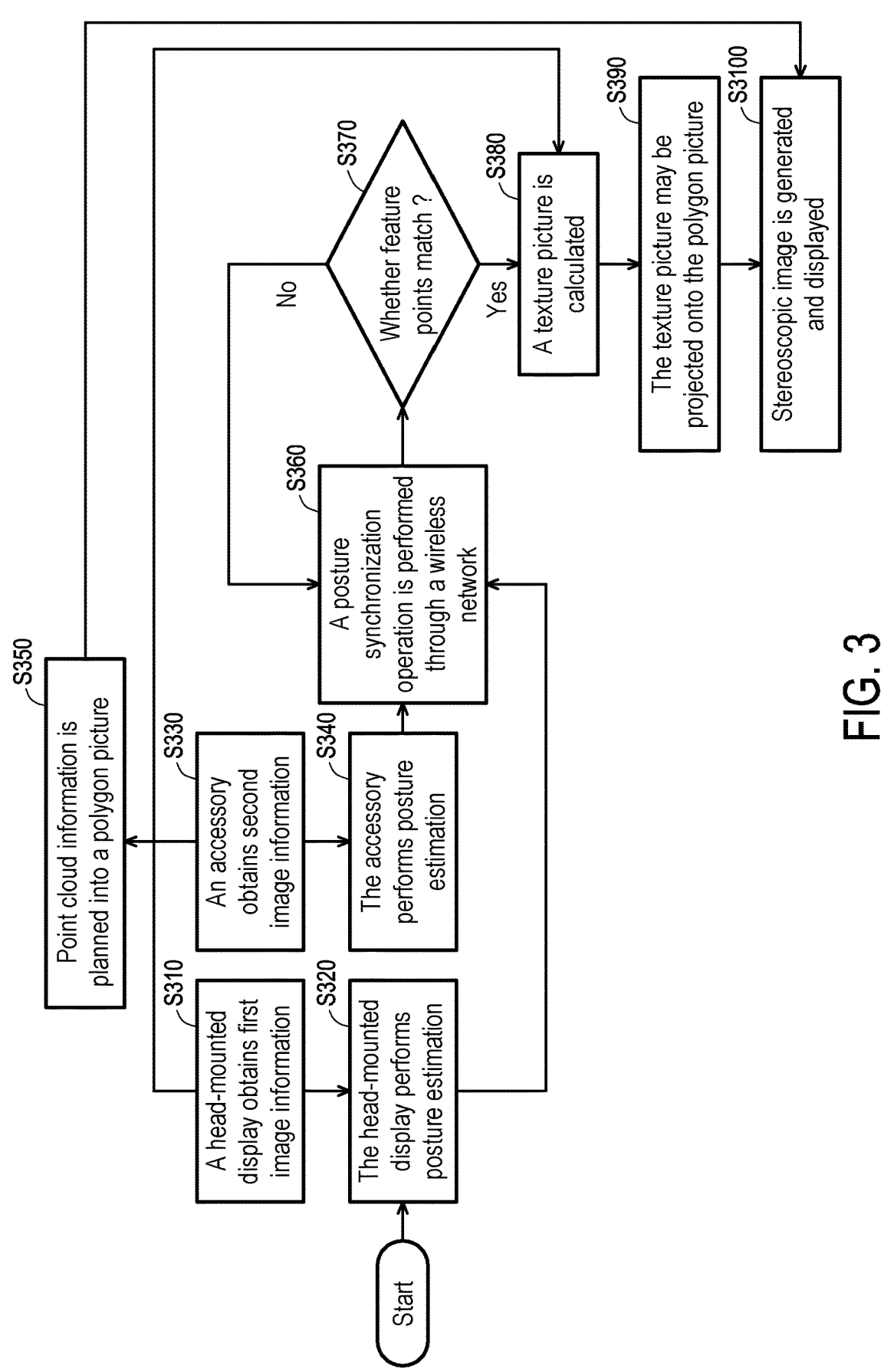
FIG. 3 is an operation flowchart of a virtual image display device according to an embodiment of the disclosure.

Referring to FIG. 3, FIG. 3 is an operation flowchart of a virtual image display device according to an embodiment of the disclosure. In step S310, a head-mounted display obtains first image information through an image capturing operation. In step S320, the head-mounted display performs posture estimation through an inertial measurement unit. In step S330, an accessory obtains second image information through an image capturing operation. In step S340, the accessory performs posture estimation through an inertial measurement unit.

In step S350, the virtual image display device may plan the point cloud information (the second image information) into a polygon picture.

In step S360, the head-mounted display and the accessory may perform a posture synchronization operation between each other through a wireless network. Then, in step S370, the virtual image display device may determine whether a plurality of corresponding feature points in the first image information and the second image information match each other. If the determination result indicates "not match", it means that there may still be an error in the posture synchronization operation of step S360, and step S360 must be executed again. If the determination result indicates "match", step S380 may be executed.

In step S380, an operation of calculating a texture picture may be performed. In step S390, the texture picture may be projected onto a polygon picture. Then, in step S3100, stereoscopic image information is generated by mixing the first image information with the polygon picture having the projected texture picture.

Implementation details of the above steps have been described in detail in the foregoing embodiments, which will not be repeated.

Figure 4:
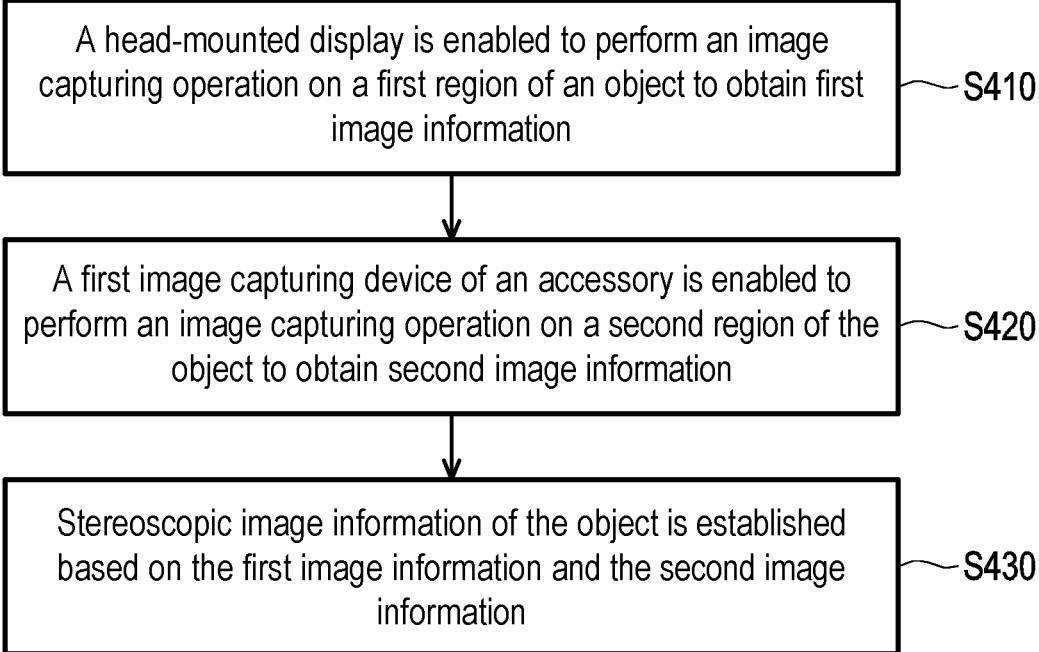
FIG. 4 is a flowchart of a stereoscopic image establishing method according to an embodiment of the disclosure.

Referring to FIG. 4, FIG. 4 is a flowchart of a stereoscopic image establishing method according to an embodiment of the disclosure. The stereoscopic image establishing method in the embodiment is adapted to a virtual image display device. In step S410, the head-mounted display is enabled to perform an image capturing operation on a first region of an object to obtain first image information. In step S420, a first image capturing device of the accessory is enabled to perform an image capturing operation on a second region of the object to obtain second image information. And, in step S430, stereoscopic image information of the object is established based on the first image information and the second image information.

Implementation details of the above steps have been described in detail in the foregoing embodiments, which will not be repeated.

In summary, the disclosure provides the image capturing device in the accessory of the virtual image display device. Then, different image information is obtained by using the head-mounted display and the accessory to perform image capturing operations on the object respectively. The virtual image display device may establish a stereoscopic image of the object based on different image information. In this way, the user does not need to rotate the head-mounted display multiple times to obtain multiple image information, which effectively improves the convenience of use of the virtual image display device, prevents the user from getting dizzy due to frequent shaking of his head, thereby effectively improving the comfort of use.

What is claimed is:

1. A virtual image display device, comprising:
a head-mounted display, configured to perform an image capturing operation on a first region of an object to obtain first image information; an accessory, having a first image capturing device, and configured to perform an image capturing operation on a second region of the object to obtain second image information, wherein the first image information is a first image, the second image information is point cloud information,
wherein the head-mounted display establishes stereoscopic image information of the object based on the first image information and the second image information and combines the first image and the point cloud information to generate the stereoscopic image information, and
respectively matches a plurality of first feature points on the first image and a plurality of second feature points on the point cloud information based on an overlapping portion of the first image information and the second image information to combine the first image and the point cloud information.

2. The virtual image display device as claimed in claim 1, wherein the head-mounted display is connected to the accessory through wireless signals, and receives the second image information from the accessory.

3. The virtual image display device as claimed in claim 1, wherein the first region of the object and the second region of the object are partially overlapped with each other but are not completely overlapped.

4. The virtual image display device as claimed in claim 1, wherein the head-mounted display has a first inertial measurement unit configured to measure first posture information of the head-mounted display, and the accessory has a second inertial measurement unit configured to measure second posture information of the accessory.

5. The virtual image display device as claimed in claim 4, wherein the head-mounted display performs a posture synchronization operation between the head-mounted display and the accessory through a wireless transmission interface based on the first posture information and the second posture information.

6. The virtual image display device as claimed in claim 1, wherein the head-mounted display generates a polygon picture based on the point cloud information, and combines a texture picture, the polygon picture, and the first image information to generate the stereoscopic image information.

7. The virtual image display device as claimed in claim 1, wherein the head-mounted display is configured to display a stereoscopic image of the object based on the stereoscopic image information.

8. The virtual image display device as claimed in claim 1, wherein the first image capturing device is a depth-of-field information capturing device.

9. A stereoscopic image establishing method, comprising:
enabling a head-mounted display to perform an image capturing operation on a first region of an object to obtain first image information;
enabling a first image capturing device of an accessory to perform an image capturing operation on a second region of the object to obtain second image information, wherein the first image information is a first image, the second image information is point cloud information; establishing stereoscopic image information of the object based on the first image information and the second image information;
respectively matching a plurality of first feature points on the first image and a plurality of second feature points on the point cloud information based on an overlapping portion of the first image information and the second image information to combine the first image and the point cloud information; and
combining the first image and the point cloud information to generate the stereoscopic image information.

10. The stereoscopic image establishing method as claimed in claim 9, further comprising:
enabling the head-mounted display and the accessory to be connected through wireless signals, and enabling the head-mounted display to receive the second image information from the accessory.

11. The stereoscopic image establishing method as claimed in claim 9, wherein the first region of the object and the second region of the object are partially overlapped with each other but are not completely overlapped.

12. The stereoscopic image establishing method as claimed in claim 9, further comprising:

measuring first posture information of the head-mounted display;

measuring second posture information of the accessory; and enabling the head-mounted display to perform a posture synchronization operation between the head-mounted display and the accessory through a wireless transmission interface based on the first posture information and the second posture information.

13. The stereoscopic image establishing method as claimed in claim 9, further comprising:

combining the first image and the point cloud information to generate a polygon picture; and projecting a texture picture onto the polygon picture to generate the stereoscopic image information.

14. The stereoscopic image establishing method as claimed in claim 9, further comprising:

enabling the head-mounted display to display a stereoscopic image of the object based on the stereoscopic image information.

* * * * *